United States Patent
Jass

(10) Patent No.: US 12,541,767 B2
(45) Date of Patent: Feb. 3, 2026

(54) SYSTEMS AND METHODS FOR CONTEXT-DRIVEN ELECTRONIC TRANSACTIONS FRAUD DETECTION

(71) Applicant: Worldpay, LLC, Symmes Township, OH (US)

(72) Inventor: Nicole S. Jass, Aurora, CO (US)

(73) Assignee: Worldpay, LLC, Symmes Township, OH (US)

( * ) Notice: Subject to any disclaimer, the term of this patent is extended or adjusted under 35 U.S.C. 154(b) by 0 days.

(21) Appl. No.: 18/053,466

(22) Filed: Nov. 8, 2022

(65) Prior Publication Data
US 2023/0060262 A1 Mar. 2, 2023

Related U.S. Application Data

(63) Continuation of application No. 15/854,435, filed on Dec. 26, 2017.

(51) Int. Cl.
G06Q 20/40 (2012.01)
G06Q 20/38 (2012.01)
G06Q 30/06 (2023.01)

(52) U.S. Cl.
CPC ....... *G06Q 20/4016* (2013.01); *G06Q 20/382* (2013.01); *G06Q 20/389* (2013.01); *G06Q 20/405* (2013.01); *G06Q 30/06* (2013.01)

(58) Field of Classification Search
CPC ................................................ G06Q 20/4016
See application file for complete search history.

(56) References Cited

U.S. PATENT DOCUMENTS

| | | | |
|---|---|---|---|
| 7,634,423 B2 | 12/2009 | Brocklebank | |
| 10,614,452 B2* | 4/2020 | Tomasofsky | G06Q 20/3674 |
| 10,902,499 B2* | 1/2021 | Kohli | G06Q 30/0633 |
| 11,270,311 B1 | 3/2022 | Jass | |
| 2003/0028481 A1 | 2/2003 | Flitcroft et al. | |
| 2007/0168265 A1 | 7/2007 | Rosenberger | |
| 2007/0228144 A1* | 10/2007 | Knackstedt | G06Q 20/00 235/376 |
| 2008/0319901 A1 | 12/2008 | Brown | |

(Continued)

OTHER PUBLICATIONS

Richard J. Bolton. David J. Hand. "Statistical Fraud Detection: A Review." Statist. Sci. 17 (3) 235-255, Aug. 2002. https://doi.org/10.1214/ss/1042727940 (Year: 2002).*

(Continued)

*Primary Examiner* — Asha Puttaiah
(74) *Attorney, Agent, or Firm* — Bookoff McAndrews, PLLC

(57) ABSTRACT

Systems and methods are disclosed for establishing fraud detection system for authorizing payment for consumer transactions based on a user's tender-switching or transaction abandonment practices. One method includes: receiving transaction history of a user, the transaction history including a first payment vehicle and a second payment vehicle; determining, of the received transaction history, one or more instances of switching from one the first payment vehicle to the second payment vehicle; and determining a user-specific fraud threshold score for the user, based on the determined instances of switching from the first payment vehicle to the second payment vehicle.

20 Claims, 7 Drawing Sheets

(56) References Cited

U.S. PATENT DOCUMENTS

| | | | |
|---|---|---|---|
| 2011/0238575 A1* | 9/2011 | Nightengale | H04L 61/5007 |
| | | | 705/44 |
| 2011/0251951 A1 | 10/2011 | Kolkowitz et al. | |
| 2012/0278137 A1 | 11/2012 | Dixon et al. | |
| 2013/0325696 A1 | 12/2013 | Graves | |
| 2014/0180798 A1 | 6/2014 | Bailey et al. | |
| 2016/0005029 A1 | 1/2016 | Ivey et al. | |
| 2016/0225025 A1 | 8/2016 | Sinha et al. | |
| 2016/0314494 A1* | 10/2016 | Dhawan | G06Q 30/0633 |
| 2020/0394664 A1 | 12/2020 | Jass et al. | |

OTHER PUBLICATIONS

Cutler, Matt, and Jim Sterne. "E-metrics." Business Metrics for the New Economy, Chicago: NetGenesis (2000). (https://web.fe.up.pt/~ee94159/sne/e-metrics.pdf) (Year: 2000).*

Indiani, Ni Luh Putu, and Gabriel Aprinau Fahik. "Conversion of Online Purchase Intention Into Actual Purchase: The Moderating Role of Transaction Security and Convenience." Verslas: teorija ir praktika 21.1 (2020): 18-29. Web. (Year: 2020).

* cited by examiner

AUTHORIZATION PROCESSOR 160

- TRANSACTION MONITOR 203
- USER THRESHOLD MODULE 207
- CONTROL LOGIC 201
- PAYMENT MODULE 205
- TENDER-SWITCHING MODULE 205

SYSTEMS AND METHODS FOR CONTEXT-DRIVEN ELECTRONIC TRANSACTIONS FRAUD DETECTION

CROSS-REFERENCE TO RELATED APPLICATION(S)

The present application is a continuation of and claims the benefit of priority to U.S. Non-provisional patent application Ser. No. 15/854,435, filed on Dec. 26, 2017, the entirety of which is incorporated herein by reference.

TECHNICAL FIELD

Various embodiments of the present disclosure relate generally to an electronic payment authorization infrastructure. More particularly, embodiments of the present disclosure relate to an authorizing or denying transactions based on a user's tender-switching practices.

BACKGROUND

An average consumer in the United States carries about four to six different credit and/or debit cards in their wallet and may use different cards for different types of transactions. Traditionally, financial institutions (e.g., banks) monitor an individual's credit or debit card activity to check for any fraudulent activities. Most transaction fraud systems monitor cardholders' buying behavior at the individual card level. However, monitoring transactions at the card level provides a limited view of the spending patterns of a consumer. Additionally, monitoring buying behavior for fraudulent activities at the individual card level creates problems, since some fraudulent activity may go unnoticed, whereas valid transactions may be inadvertently declined. The most common solution today is to decline suspicious transactions even without confirmation of fraud, which then typically prompts the consumer to use a different credit/debit card to complete the transaction. This practice further results in a poor consumer experience and lost revenue opportunities for the merchant, as well as for card issuers or other financial institutions.

The present disclosure is directed to overcoming one or more of these above-referenced challenges.

SUMMARY OF THE DISCLOSURE

According to certain aspects of the disclosure, systems and methods are disclosed for authorizing payment for consumer transactions based on a user's tender-switching practices.

In one embodiment, a computer-implemented method is disclosed for authorizing payment for consumer transactions based on a user's tender-switching or abandonment practices. The method includes: receiving transaction history of a user, the transaction history including a first payment vehicle and a second payment vehicle; determining, of the received transaction history, one or more instances of switching from one the first payment vehicle to the second payment vehicle; and determining a user-specific fraud threshold score for the user, based on the determined instances of switching from the first payment vehicle to the second payment vehicle.

In accordance with another embodiment, a system is disclosed for authorizing payment for consumer transactions. The system comprises: a data storage device storing instructions for authorizing payment for consumer transactions in an electronic storage medium, and a processor configured to execute the instructions to perform a method including: receiving transaction history of a user, the transaction history including a first payment vehicle and a second payment vehicle; determining, of the received transaction history, one or more instances of switching from one the first payment vehicle to the second payment vehicle; and determining a user-specific fraud threshold score for the user, based on the determined instances of switching from the first payment vehicle to the second payment vehicle.

In accordance with another embodiment, a non-transitory machine-readable medium is disclosed that stores instructions that, when executed by a computer, cause the computer to perform a method for authorizing payment for consumer transactions. The method includes: receiving transaction history of a user, the transaction history including a first payment vehicle and a second payment vehicle; determining, of the received transaction history, one or more instances of switching from one the first payment vehicle to the second payment vehicle; and determining a user-specific fraud threshold score for the user, based on the determined instances of switching from the first payment vehicle to the second payment vehicle.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts a block diagram of an exemplary authorization processor for authorizing or denying transactions based on a user-specific fraud threshold score, according to an exemplary embodiment of the present disclosure.

Figure 1:
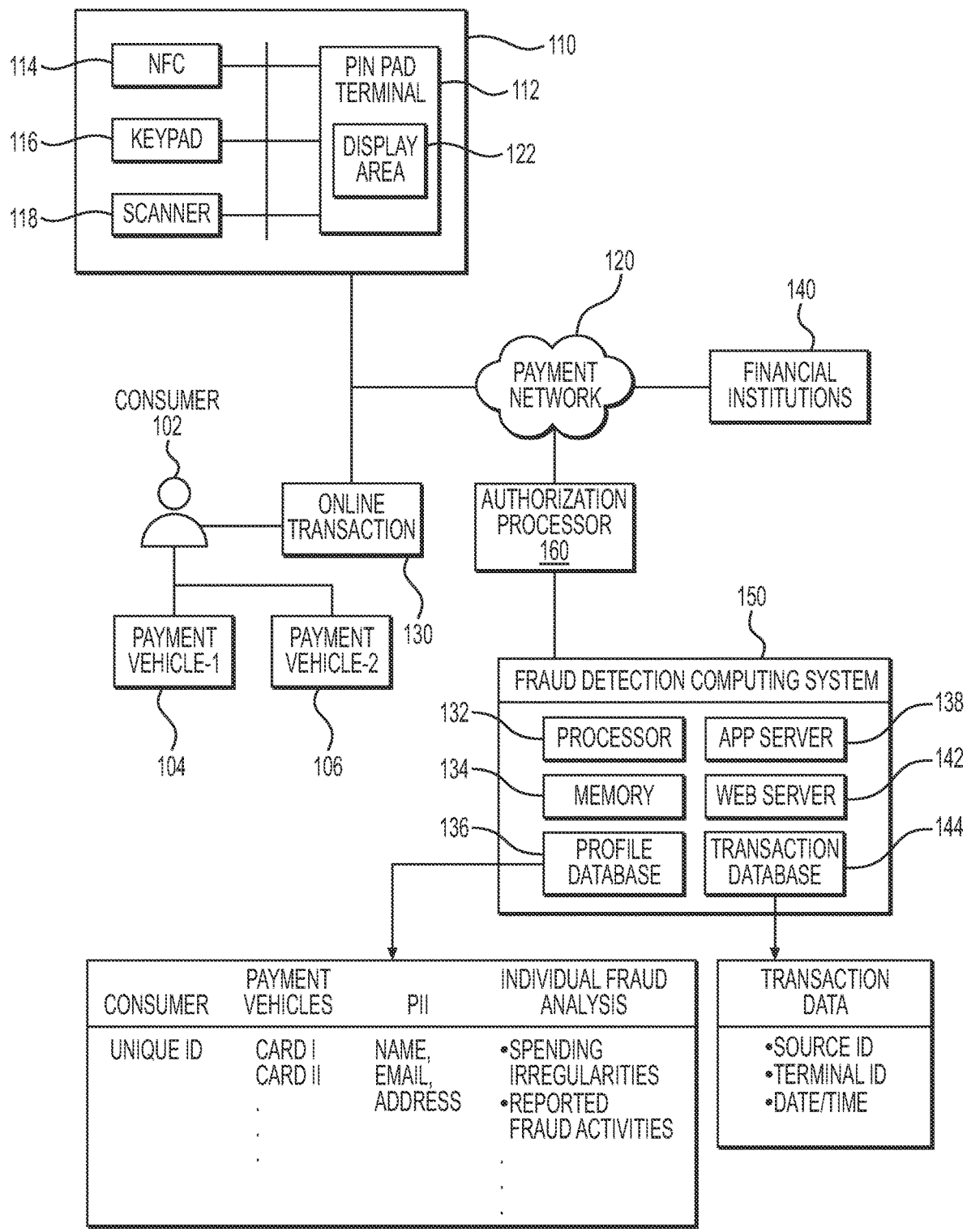
FIG. 1 depicts a block diagram of a cross-issuer fraud detection computing system for establishing a cross-issuer fraud detection system for payment vehicles used by consumers, according to an exemplary embodiment of the present disclosure.

As used herein, the term "exemplary" is used in the sense of "example," rather than "ideal." In addition, the terms "first," "second," and the like, herein do not denote any order, quantity, or importance, but rather are used to distinguish one concept or structure from another. Moreover, the terms "a" and "an" herein do not denote a limitation of quantity, but rather denote the presence of one or more of the referenced items. For the purposes of the disclosure, "user" or "consumer" are used interchangeably, and may refer to any individual or person for whom a transaction is being enacted.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

As described above, there is a desire to refine payment mechanisms to balance risk of fraud against revenue opportunities for a merchant or financial institution. Thus, the embodiments of the present disclosure are directed to a system and method in which payment authorization may account for a user's transaction habits when given the option of multiple forms of payment. For example, a user may have multiple credit and debit cards. The present disclosure includes a system and method that may authorize or deny transaction authorization in light of the user's practices in switching among his/her many credit or debit cards. In particular, payment authorization for a single transaction may depend on the user's likelihood or habit of switching between his/her multiple credit and debit cards (aka, tender-switching habit).

In various embodiments, tender-switching may refer to a user switching from one form of tender (e.g., a credit card) to another form of tender (e.g., a second credit card). Non-fraudulent transactions are desirable. However, merchants may favor completing transactions and absorbing the risk of fraud. One way to lower the risk of fraud while accounting for a merchants' desire to complete a transaction, is to deny suspicious transactions until either a consumer may abandon the transaction, or until the risk of fraud is below a predetermined risk tolerance threshold. Abandoning the transaction may entail a user opting to not complete a transaction. For example, a user who has his/her credit card denied may leave a transaction/merchant site without completing the transaction. Some users may switch to another form of payment and try to complete a transaction if his/her payment is denied; other users may abandon a transaction if his/her payment is denied.

For example, one user, user "A" may switch tender until a form of tender is accepted for a transaction. For instance, user "A" may switch from one credit card to another until a credit card is accepted. Another user, user "B" may abandon a transaction if a single credit card is denied. In other words, user "B" may not switch tender at all before abandoning a transaction. In one embodiment of the present disclosure, user "A" may have his/her suspicious transactions denied at a higher frequency because tender-switching practices of user "A" indicate that user "A" will switch tender until suspicion of fraud is reduced. According to one embodiment of the present disclosure, user "B", may not have his/her first credit card denied even if the transaction is as suspicious as user "A"'s transaction. This is because the exemplary system and method may prioritize completing the transaction over risk of fraud. If the disclosed system detects that user "B" may abandon the transaction if his/her credit card is denied, the system may opt to complete the transaction and authorize the credit card even if the transaction may be fraudulent.

Exemplary user "C" may generally try three (3) payment vehicles out of his/her wallet prior to abandoning a transaction. In such a case, the disclosed systems and methods may include denying the transaction until user "C" has switched tender twice, meaning user "C" may be on the verge of abandoning the transaction. At this point, the third form of payment (e.g., credit card) offered by user "C" may be accepted for payment in the transaction, even if the suspicion of fraud for the transaction has not decreased, or has not decreased past a threshold acceptable for the transaction to not likely be fraudulent.

In any of the embodiments, payment may be authorized if the suspicion of fraud decreases to the point that the transaction is not likely be fraudulent. For example, even if user "C" can be denied authorization twice before abandonment, authorization may be granted if the likelihood of fraud is very low upon user "C" offering the second payment vehicle.

In one embodiment, each authorization request for a transaction may include a fraud risk score. The fraud risk score may serve as an indication of the likelihood that the authorization request is fraudulent. For example, a high risk score may indicate that the request is more likely fraudulent and a low risk score may indicate that the request is not likely fraudulent. The fraud risk score may be based on the payment vehicle being used, a transaction history associated with the payment vehicle, the location of the transaction, the payment amount associated with the transaction, prior payment vehicle(s) used for the transaction, etc. For example, a fraud risk score may be higher for a new payment vehicle (e.g., a newly issued credit card) over a payment vehicle that may have a long transaction history. A fraud risk score may also be higher for payment vehicles with lower interest rates or for payment vehicles with direct access to financial institutions (e.g., debit cards). A location of a transaction may impact a fraud risk score. For example, if a user's transaction history is generally in city "X" and the user's payment vehicle is being used in city "Y," an authorization request received from a location in city "Y" may prompt an increased fraud risk score. The payment amount may also influence a fraud risk score, e.g., if authorization is requested for a payment significantly higher than the user's typical transactions. For instance, if a user's transactions typically total to $2,000 per a month, an authorization request for a single, $4,000 purchase may prompt an increased fraud risk score.

A payment vehicle may include any form of payment, including credit cards, debit cards, smart cards, gift cards, pre-paid cards, electronic currency (e.g., currency provided through a cellular telephone, personal digital assistant, decentralized ledger), etc. payment vehicles may include traditional plastic transaction cards, titanium-containing, or other metal-containing transaction cards, translucent transaction cards, foldable or otherwise unconventionally-sized transaction cards, radio-frequency enabled transaction cards, quick response codes ("QR codes"), etc. A payment vehicle may include electronic functionality provided by a network of electronic circuitry that may be printed or otherwise incorporated onto or within the payment vehicle (e.g., known in the art as a "smart card"), include a fob having a transponder and an RFID reader, and/or employ any image/code reader known in the art.

In one embodiment, financial institutions may set fraud tolerance scores. In other words, financial institutions may set fraud tolerance scores for the level of fraud they are willing to tolerate. In one embodiment, fraud tolerance scores may also be user-specific, given the fraudulent activity associated with a user, or given a user's transaction history. For instance, a financial institution may set a higher fraud tolerance score for user(s) that are rarely associated with any fraudulent activity. If a user has several incidences of fraudulent activity in his/her transaction history, a financial institution may set a low tolerance risk score for that user. In some scenarios, fraud tolerance scores may be set or adjusted at predetermined time intervals (e.g., every year or every quarter). Time intervals may also correspond to factors that are not related to a selected user. For example, the number of transactions may experience a spike in November and December as many users are preparing for holidays. During this time, financial institutions may set a low fraud tolerance score, since the institutions may not be able to sustain high amounts of fraud when transactions are occurring at such high numbers. Alternately or in addition, fraud tolerance scores may be adjusted on a continual basis, as transaction data is received for each user. Exemplary transaction data may include an identifier of the merchant, an identifier of the user, an identifier of one or more payment means accessed for payment of the transaction, an itemization of the goods and/or services transacted for, any geographical and/or temporal information of the transaction, any taxes, tips, and/or gratuities, any discounts, coupons, reductions, any fees directed towards acquirers, issuers, payment networks, currency exchange rates, and any other attributes of the payment transaction.

In one embodiment, a user's tender-switching practices may be used to compute a user-specific fraud threshold score. In one embodiment where tender-switching takes place between multiple credit cards or debit cards, the fraud threshold score may include a cardholder-specific fraud threshold score. Tender-switching practices may be monitored with any form of tracked payment (e.g., via credit cards, debit cards, payment applications, payment services, blockchain, etc.).

In one embodiment, transactions may be authorized or denied, based on a comparison between a user-specific fraud threshold score and a fraud risk score (e.g., of a financial institution). For example, a transaction may be denied if a fraud risk score exceeds a user-specific fraud threshold score. On the other hand, a transaction may be authorized if a fraud risk score is below a user-specific fraud threshold score.

While the above embodiments are described in the context of tender-switching practices, the disclosed embodiments may also be applied to a user's tendency for transaction abandonment (or cart abandonment). Cart abandonment may refer to the likelihood of a user adding goods or services to a proposed transaction or "cart" for purchase, and yet not proceeding with purchase of those goods or services. It should be appreciated that "cart abandonment" does not necessarily involve a "cart."

In some cases, a tendency for cart abandonment may be related to or a function of a consumer's tendency for tender-switching. For example, cart abandonment may take place when a user is at the stage of purchasing, and the user may offer various forms of payment (switching of tender) to complete the purchase. In some cases, a user may abandon a virtual or physical shopping cart after a certain amount of tender switching. This type of scenario may involve a cart abandonment metric being inversely related to a tender-switching metric. For instance, a user with a low tender-switching metric (or low likelihood of tender-switching) may have a high cart abandonment metric (high likelihood of abandoning his/her cart and purchase transaction). Conversely, a user who has a high tolerance for switching tender (high tender-switching metric) may have a low cart abandonment metric. In such cases, a cart abandonment metric may be used to infer a tender-switching metric, or a tender-switching metric may be used to compute a cart abandonment metric. Both or either of the cart abandonment metric and the tender-switching metric may be used to compute the user-specific fraud threshold score.

In other cases, a cart abandonment metric may be independent from tender-switching metric(s). Such cases may include scenarios where cart abandonment takes place before a user even attempts to make a purchase. For example, a user may add item(s) to a (virtual or physical) shopping cart, yet not proceed to purchase the item(s). In one scenario, a user may remove a shopping cart or at least one item from a shopping cart without making any purchases. In another scenario, a user may add an item to a shopping cart at one point in time, and not attempt to purchase the item until a much later point in time (e.g., multiple months after the first point in time). The item price may fluctuate during the time that the item is in the cart, or the availability of the item may change while it is in the cart. Cart abandonment may occur when an item is no longer in stock after it has been added to the user's cart for a period of time. The user may opt to remove the item, rather than waiting for the item to be stocked. In the cases where cart abandonment is unrelated to tender-switching, a cart abandonment metric may be used to evaluate a user's general purchasing habits, in addition to fraud assessment.

One or more examples of these non-limiting embodiments are illustrated in the selected examples disclosed and described in detail with reference made to FIGS. 1-6 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Turning to FIG. 1, an exemplary system infrastructure is depicted for payment processing within a merchant environment, according to one or more embodiments. In an example embodiment, a consumer 102 may use one or more payment vehicles for conducting transactions at one or more merchants 110 through a payment system 100. As shown in FIG. 1, merchant 110 may provide infrastructure for processing electronic payment requests. In one embodiment, a consumer 102 may pay for goods or services from a merchant 110 at a PIN pad terminal 112 associated with a point-of-sale ("POS") terminal. In one embodiment, an authorization processor 160 that handles financial transactions may transfer payment between the financial institution 140 of consumer 102 and that of merchant 110.

In one embodiment, consumer 102 may submit payment information at the PIN pad 112 associated with the merchant's POS terminal by swiping his/her payment card, inserting his/her chip-based payment card, through wireless near field communication (NFC), through a payment app, via a Quick Response code ("QR" code), etc., or by any other suitable means. PIN pad 112 may send a payment authorization request by way of a computer network 120 to an authorization processor (e.g., one of financial institutions 140). Alternatively, such a request may be sent by a component that controls a flow of a transaction, such as point of sale (POS) engine. The authorization processor 160 may request, by way of payment network 120, an electronic transfer of funds from the received funds to the financial institution 140 associated with merchant 110.

In general, a cross-issuer fraud detection computing system 150 may be operated by an authorization processor, issuer processor, card issuer, or any other financial institution 140. The cross-issuer fraud detection computing system 150 may be operated by another entity or operated independently. In any event, cross-issuer fraud detection computing system 150 may be configured to intercept authorization requests sent across payment network 120, or otherwise receive data about payment transactions sent between merchants 110 and financial institutions 140.

In an example embodiment, a cross-issuer fraud detection computing system 150 may comprise processor 132, memory 134, profile database 136, transaction database 144, application server 138, and web server 142. The profile database 136 for an individual user may store a unique identifier hash recognizing the profile of the user, primary account numbers (e.g., PANs) or other identifiers of payment vehicles (e.g. debit, credit cards, mobile applications, etc.) associated with the user, personally identifiable information (PII), and/or data/analysis of an user's spending habits, geographic area, and fraud activities reported on the cards associated with the user. In an example embodiment, the personally identifiable information (PII) about the user involves at least one of his/her name, email address, date of birth, social security number, and physical address.

The transaction database 144 may store transaction data associated with the payment vehicles 104 and 106. A plurality of transaction parameters associated with consumer 102 (or payment vehicle 104 and payment vehicle 106) may be stored as transaction data. transaction parameters may include account number, card number, payment vehicle information, product information (e.g., product identifier, product type, product serial number, etc.), transaction amount, loyalty account information, merchant information (e.g., source ID, terminal ID, IP address, transaction location, etc.), transaction date and time, whether the transaction was a 'card present' transaction, etc.

FIG. 2 is a block diagram of an exemplary model 200 of an authorization processor 160 for authorizing or denying transactions based on a user-specific fraud threshold score, according to an exemplary embodiment of the present disclosure. In one embodiment, authorization processor 160 may communicate with the cross-issuer fraud detection computing system 150 over payment network 120 (e.g., using any suitable modem, wireless adapter, etc.). As shown in FIG. 2, authorization processor 160 may include a control logic 201, a transaction monitor 203, a tender-switching module 205, a user threshold module 207, and a payment module 209. Control logic 201 may direct the functions and interactions among the various modules.

In one embodiment, the control logic 201 and transaction monitor 203 may receive transaction data, e.g., from the transaction database 144 of the cross-issuer fraud detection computing system 150. The transaction monitor 203 may detect authorization requests of one or more payment vehicles associated with a particular user, data on transactions completed using one or more of the payment vehicles, authorization requests that do not have corresponding completed transaction data, etc.

The control logic 201 and tender-switching module 205 may identify instances of transactions that are associated with more than one payment vehicle. For example, for a single transaction, transaction data may include an authorization request associated with a first payment vehicle, a denial of the first payment vehicle, an authorization request for the transaction associated with a second payment vehicle, and data indicating that the transaction was completed using the second payment vehicle. In other words, the control logic 201 and tender-switching module 205 may detect the instances in which a user switches from one form of tender (e.g., a first payment vehicle) to another form of tender (e.g., a second payment vehicle).

The control logic 201 and tender-switching module 205 may detect the forms of tender that a user may switch between, the frequency at which a user may switch tender, and the number of times that a user may switch tender. The forms of tender that a user may switch between may include, for instance, a user switching between multiple credit cards if a credit card is denied. Another form of tender switching may include switching from a credit card to a debit card, or switching from a credit card to cash. The frequency that a user may switch tender may include detecting whether a user consistently uses one payment vehicle (e.g., a first credit card) for virtually all purchases, or whether a user switches between various payment vehicles, depending on the transaction. For example, a user may use a first payment vehicle for most travel expenses, a second payment vehicle for daily expenses (e.g., groceries or hobbies), and cash for small purchases.

The number of times that a user may switch tender may include how many times a user may switch tender before abandoning a transaction. For example, the control logic 201 and tender-switching module 205 may detect the number of times a user will switch tender if each form of tender is denied. For instance, one user may abandon a transaction if his/her credit card is denied. Another user may try 2-3 different credit cards or debit cards if authorization for a transaction using a first payment vehicle is denied. Yet another user may try several forms of alternate payment, in an attempt to complete the transaction rather than leaving without completing the purchase. The control logic 201 and tender-switching module 205 may assign, for each user, a metric based on the user's tender-switching practices. In one embodiment, the metric based on the user's tender-switching practices may be used to compute a cart abandonment metric for the user. As previously described, a metric describing a user's tender-switching practices may be inversely related to a user's abandonment metric. Alternately or in addition, control logic 201 may be adapted to compute or determine a cart abandonment metric. In one embodiment, the cart abandonment metric may be used to infer a user's tender-switching metric.

In one embodiment, one metric may be computed over another, depending on characteristics of the purchase. For example, a tender-switching metric may be calculated for either virtual or physical purchase transitions, whereas a cart abandonment metric may be more readily detected for virtual purchase transactions. In one embodiment then, if a purchase is being made virtually, control logic 201 may be configured to compute an abandonment metric (and optionally compute a tender-switching metric associated with the abandonment metric). If a purchase is being made at a physical store, a tender-switching metric may be computed (and a corresponding abandonment metric may be determined). In other words, control logic 201 may be configured differently depending on the type of transactions encountered, or control logic 201 may detect one or more characteristics of a transaction, and compute either a tender-switching metric or an abandonment metric based on the characteristics.

Figure 3A:
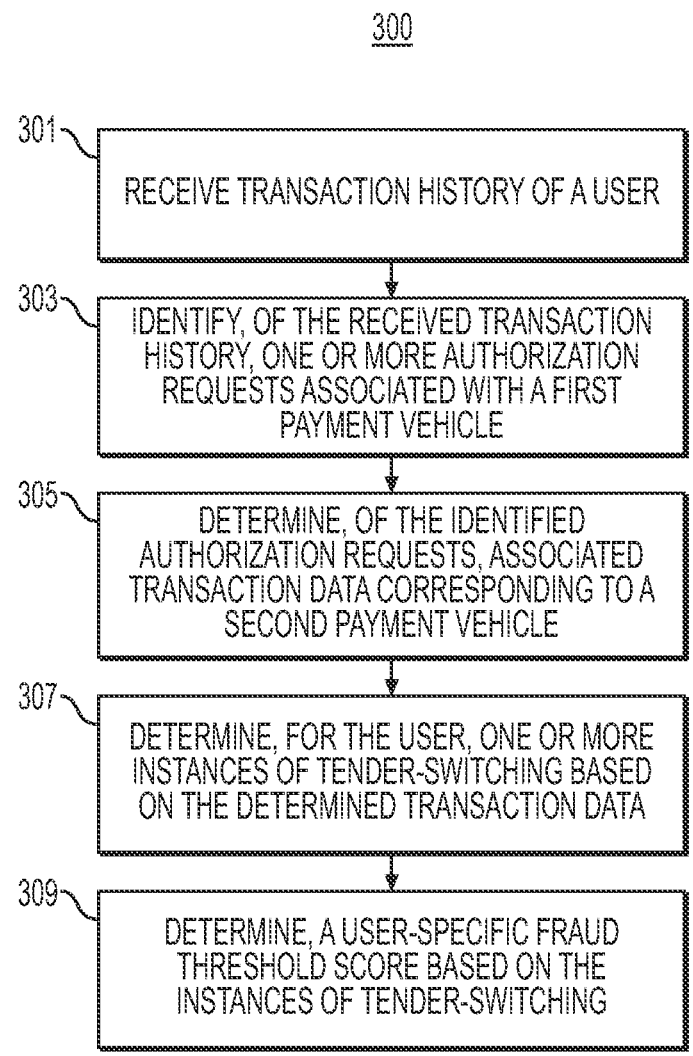
FIG. 3A depicts a flowchart of a method for generating a user-specific fraud threshold score based on the user's tender-switching practices, according to an exemplary embodiment of the present disclosure.
Figure 3B:
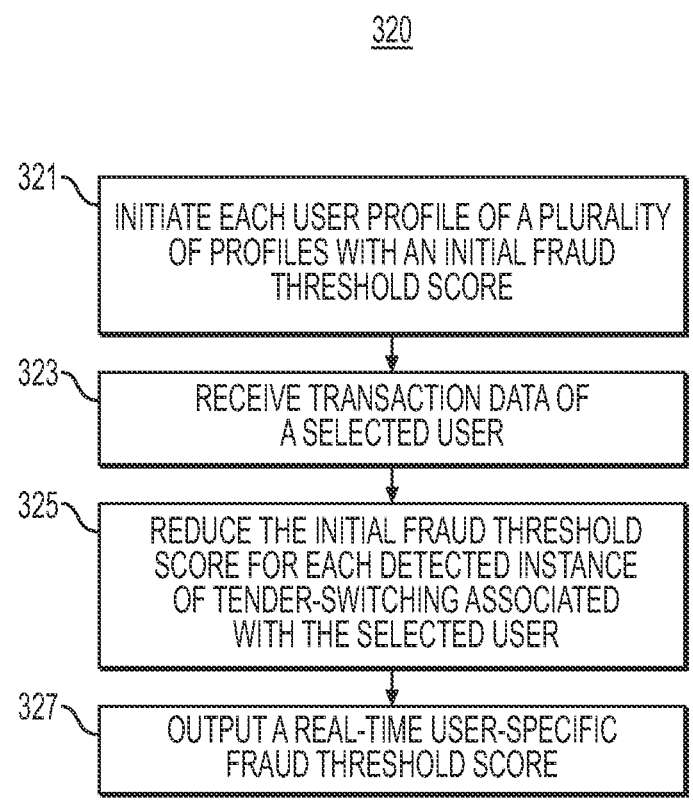
FIG. 3B depicts a flowchart of a detailed method for computing a user-specific fraud threshold score, according to an exemplary embodiment of the present disclosure.

For each user detected in payment system 100, control logic 201 and user threshold module 207 may compute a user-specific fraud threshold score, based on each user's tender-switching practices (or cart abandonment practices). For example, control logic 201 and user threshold module 207 may assign a high user-specific fraud threshold score to a user that may not complete a transaction if his/her first attempt at completing the transaction is unsuccessful. For example, a high user-specific fraud threshold score may be assigned to a user that leaves a store if his/her credit card is denied. A low user-specific fraud threshold score may be associated with a user that switches tender multiple times if his/her credit cards are denied. FIGS. 3A and 3B include exemplary methods of computing a user-specific fraud threshold score.

The control logic 201 and payment module 209 may authorize or deny a transaction based on a user-specific fraud threshold score. In one embodiment, a merchant's priority is to complete a transaction, and completing a non-fraudulent transaction is a secondary concern. In such a case, payment authorization and risk of fraud is balanced against the likelihood that a user will abandon the transaction. For example, if a user is likely to abandon a transaction immediately after his/her first payment vehicle is denied, a merchant's interest is to complete the transaction even if there is indication that the payment may be fraudulent. If, however, a user is willing to switch to another form of payment, a merchant may deny authorization until a non-fraudulent form of payment is used, until the likelihood of fraudulent payment is reduced, or until the user is likely to abandon the transaction.

In one embodiment, the control logic 201 and payment module 209 may receive a request to authorize payment for a transaction. The control logic 201 and payment module 209 may then authorize or deny the transaction based on a user-specific fraud threshold score. In addition, the control logic 201 and payment module 209 may deny a transaction a certain number of times, based on the user-specific fraud threshold score. For example, if a user's fraud threshold score indicates that the user will not switch tender at all before abandoning a transaction, the control logic 201 and payment module 209 may authorize a transaction even if the likelihood of fraud is high. Given the same likelihood of fraud but a user with a fraud threshold score indicating that the user will switch tender three times before abandoning a transaction, the control logic 201 and payment module 209 may deny a transaction two times. Even if the likelihood of fraud is not reduced with the third form of tender offered by the user, the control logic 201 and payment module 209 may authorize the transaction with the third form of tender presented by the user, so that the transaction is completed before the user abandons the transaction. For a user with a low fraud threshold score (indicating that the user will likely switch tender several times), the control logic 201 and payment module 209 may deny authorization until the likelihood of fraud is reduced to an amount acceptable to complete the transaction.

Since the authorization processor 160 may recognize the tender that a user switches between, the authorization processor 160 may recognize when a user is reaching his/her last form of tender. In one embodiment, the control logic 201 and payment module 209 may authorize a transaction when a user is offering his/her last form of tender for the transaction, even if the likelihood of fraud is not at a level acceptable to complete a transaction. For example, a user may consistently use his/her debit card as the last option for payment. In this case, regardless of whether the user switches cards once or several times, an authorization request from the debit card signals that the user may be about to abandon a transaction. In such a case, the control logic 201 (and payment module 209) may grant payment authorization in response to the authorization request.

Further, payment authorization may take into account changes to a likelihood of fraud as tender-switching is observed for a single transaction. For example, risk of fraud may be increasingly lowered if receiving authorization requests are received from various forms of tender in an order that follows the sequence in which a user typically switches tender may lower the risk of fraud. If tender is being offered in a sequence that follows the user's usual practices, likelihood of fraud may be low. For the same reason, risk of fraud be higher in situations where authorization request are received from tender or in an order deviating from transaction data of the user associated with the tender.

In one embodiment, each financial institution 140 may designate a risk threshold at which the risk of fraud is low enough for a transaction to be completed. For example, a large financial institution 140 may determine that it has a relatively high risk threshold since it is stable enough to sustain a higher risk. A smaller financial institution 140 may set a lower risk threshold since it cannot sustain a high number of fraudulent transactions. Alternately, a small financial institution 140 may set a high risk threshold to attract more business, so that more merchants or consumers would be willing to work with the small financial institution 140. A large financial institution may have the leverage to service a major population of merchants or consumers without needing to sustain the risk of having a high risk threshold for fraudulent transactions.

FIGS. 1 and 2 and the discussion above provide a brief, general description of a suitable computing environment in which the present disclosure may be implemented. In one embodiment, any of the disclosed systems and/or methods may be executed by or implemented by a computing system consistent with or similar to that depicted in FIGS. 1 and 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 4:
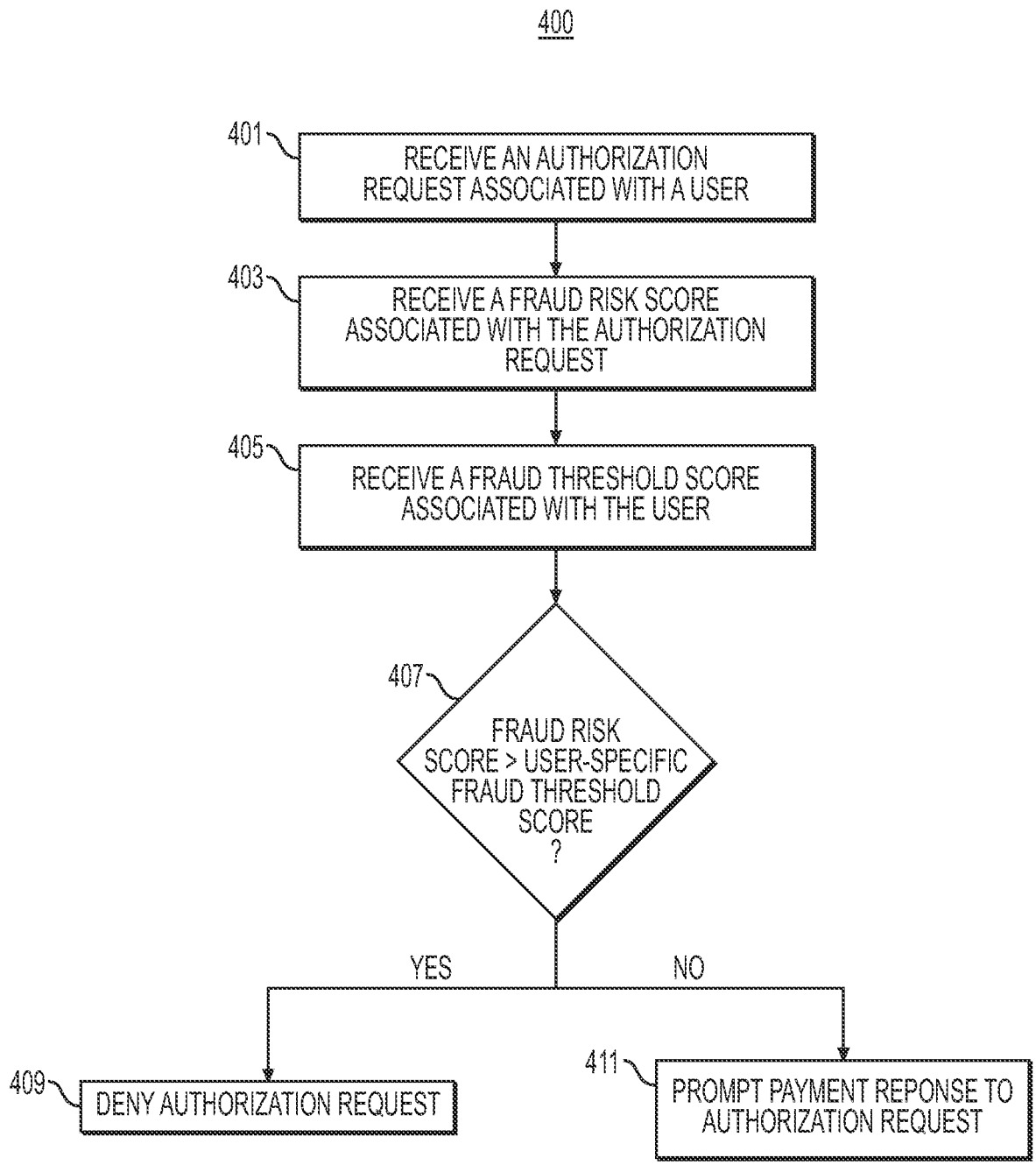
FIG. 4 depicts a flowchart of a method for processing payment for a transaction based on the user-specific fraud threshold score, according to an exemplary embodiment of the present disclosure.

FIG. 3A depicts an exemplary method for generating a user-specific fraud threshold score based on the user's tender-switching practices. FIG. 3B depicts a detailed exemplary method for computing the user-specific fraud threshold score. FIG. 4 depicts an exemplary method for processing payment for a transaction, based on the user-specific fraud threshold score.

FIG. 3A is a flow diagram of an exemplary method 300 for generating a user-specific fraud threshold score based on the user's tender-switching practices, according to an exemplary embodiment of the present disclosure. Step 301 may include receiving the transaction history of a user. For example, step 301 may include receiving identification information associated with a selected user and accessing a profile associated with the user. The profile may include one or more payment vehicles associated with the user, as well as a fraud assessment associated with the user. Transaction history of the user may include data on the user's usage of each of the payment vehicles associated with the user. Transaction history may also include one or more authorization requests for transactions associated the user and completed transactions associated with the user.

In one embodiment, steps 303 and 305 may include isolating transactions in which tender switching takes place. For example, step 303 may include identifying, of the received transaction history, one or more authorization request(s) associated with a first payment vehicle. Step 305 may include determining, of the identified authorization requests, a transaction associated with the authorization request. For each determined transaction, step 305 may include detecting transaction data associated with a second payment vehicle. The transaction data associated with the second payment vehicle may include a second authorization request for the determined transaction, where the second authorization request is associated with the second payment vehicle. The transaction data may also include data of transaction completion using the second payment vehicle.

In one embodiment, step 307 may include determining, for the user, one or more instances of tender switching, based on the transaction data associated with a second payment vehicle. For example, steps 303 and 305 include isolating, from a user's transaction history, transactions where authorization is sought from more than one form of tender. Step 307 may include identifying these types of transactions as instances of tender switching.

In one embodiment, method 300 may further include detecting authorization requests in a user's transaction history, where the authorization request is not paired with a payment authorization at all. In such cases, the user may have abandoned the transaction after the payment authorization was denied.

In one embodiment, step 309 may include determining a user-specific threshold fraud score based on the detected instances of tender switching. Put another way, step 309 may include determining a user-specific threshold fraud score based on the detected instances of a user abandoning a transaction, or instances of a user switching tender prior to abandoning a transaction.

FIG. 3B is a flow diagram of an exemplary method 320 for a computing the user-specific fraud threshold score, according to an exemplary embodiment of the present disclosure. In one embodiment, step 321 may include receiving a profile associated with a user new to payment system 100. Step 321 may include providing the user profile with an initial fraud threshold score. In one embodiment, every user of payment system 100 may start at the same initial fraud threshold score.

In one embodiment, step 323 may include receiving transaction data of the user. In one embodiment, step 323 may include detecting, in the received transaction data, instance(s) of tender switching. For example, step 323 may include defining indications of tender switching. Tender switching may be detected from transaction data in a variety of ways. One exemplary indication of tender switching may include authorization requests being receiving from multiple payment vehicles for the same transaction. Another indication of tender switching may include detecting that a transaction is completed with payment from a source other than a payment vehicle that had requested authorization for the transaction. Step 323 may include defining one or more indicators of tender switching, and tracking the tender-switching behavior associated with the user.

In one embodiment, step 325 may include reducing the initial fraud threshold score (e.g., of step 321) for each detected instance of tender switching in the transaction data. In other words, each instance of tender switching may trigger a reduction in the initial fraud threshold score. In one embodiment, the reduction in the initial fraud threshold score may be predetermined, relative to the detected number of tender switching instances. In one payment network, a fraud threshold score may be reduced by 0.1 points for each detected instance of tender switching. Another payment network may dictate that a fraud threshold score is reduced by 0.1 points for every 100 detected instances of tender switching. Different types of tender switching may also trigger different score changes. For example, switching between credit cards may entail one predetermined reduction of the score, while switching from a credit card to cash may entail a different predetermined reduction of the score. Further, the types of cards used may involve different changes to the user-specific fraud threshold score. For example, a user may possess a few cards that are not widely accepted by merchants. In such a case, a user switching between those cards may not trigger a great reduction in fraud threshold score, whereas a user switching between widely accepted cards may prompt a greater reduction.

Score reductions may also change if a user's frequency of tender switching increases or shows signs of irregularity during certain periods of time. For example, a user may rarely engage in tender switching for years, and then there may be a spike in tender switching activity during a period of months. Step 325 may reduce the score by a predetermined amount specifically for the frequency of tender-switching.

In one embodiment, step 327 may include computing a user-specific fraud threshold score based on the received transaction data. In one embodiment, the user-specific fraud threshold score may be computed in real-time, as data is received regarding a user's transactions. The reductions of the fraud threshold score may be made to the initial fraud threshold score, as well as the user's score at any point in time. Although the embodiment of method 320 describes the changes to the user's fraud threshold score as reductions, one of ordinary skill in the art may recognize that an alternate embodiment may include increasing a fraud threshold score as the instances of tender switching increase.

FIG. 4 is a flow diagram of an exemplary method 400 for processing payment for a transaction based on the user-specific fraud threshold score, according to an exemplary embodiment of the present disclosure. In one embodiment, step 401 may include receiving an authorization request for a transaction associated with a user. Step 403 may include receiving a fraud risk score associated with the authorization request. Step 405 may include receiving a fraud threshold score associated with the user. In one embodiment, step 407 may include comparing the fraud risk score against the user-specific fraud threshold score. Step 409 may include denying the authorization request if the fraud risk score exceeds the user's fraud threshold score, and step 411 may include authorizing payment in response to the authorization request if the fraud risk score is lower than the user's fraud threshold score. One of ordinary skill in the art may recognize that an alternate embodiment may be designed such that payment may be denied when the fraud risk score exceeds the user's fraud threshold score, and accepted when the fraud risk score is below the user's fraud threshold score.

Figure 5:
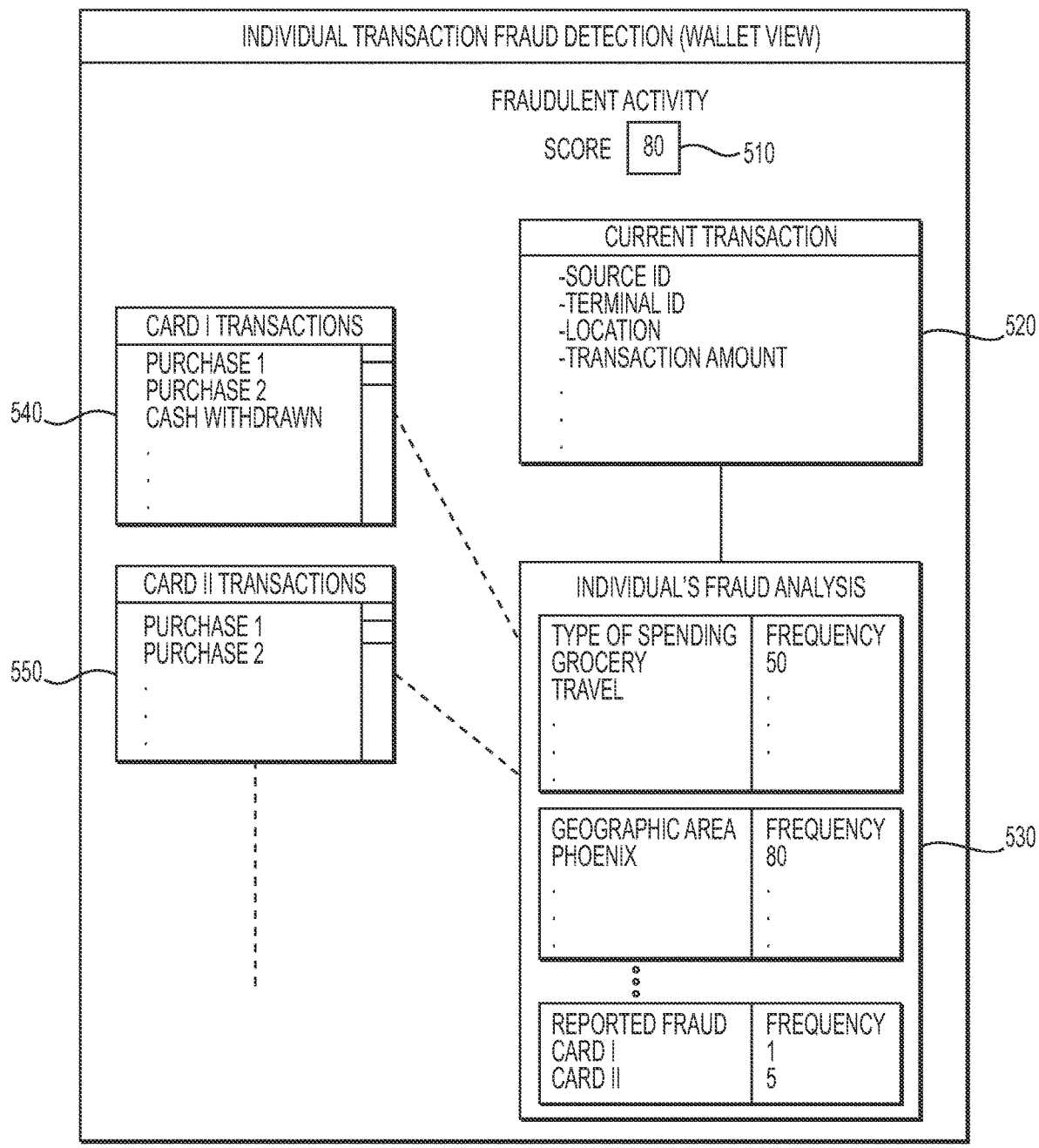
FIG. 5 depicts a screenshot of an exemplary presentation of an individual (e.g., "wallet level") cross-issuer fraud detection analysis, according to an exemplary embodiment of the present disclosure.

FIG. 5 is an exemplary representation 500 of a transaction analysis that may be presented to a financial institution 140. Financial institutions may rely on consumer clients (e.g., users), as well as merchant partnerships. As previously discussed, each financial institution may balance the institution's fraud risk tolerance relative to merchants' desire for a transaction to be completed. In one embodiment, a financial institution may view or monitor each user's transaction data along with an individual fraud analysis. In one embodiment, each user's fraud analysis may be consolidated as an individual user's fraudulent activity score 510. The score may account for each transaction (e.g., current transaction data 520) relative to the user's historic transaction data 530. The historic transaction data 530 may include merchants that a user frequents, the frequency in which the user spends at each of the merchant, the amount spent per transaction, the general geographic area in which the user spends, the payment vehicle(s) used by the user, the order in which the payment vehicle(s) are used, etc. Over time, the historic transaction data 530 may provide insight into a user's spending habits, irregularities in a user's spending habits, and reported fraudulent activities associated with the user and/or the user's payment vehicle(s). Data of each current transaction 520 may be stored as historic transaction data 530 upon detection of the completion or abandonment of a transaction.

The transaction analysis may further include records of transactions associated with each payment vehicle of a user (e.g., Card I transactions 540 of a first payment vehicle and Card II transactions 550 of a second payment vehicle). Tender switching may be detected if authorization for a transaction is sought from both a first payment vehicle and a second payment vehicle. In one embodiment, tender switching may be inferred if Card I transactions 540 and Card II transactions 550 indicate authorizations requests being submitted for the same transaction. Historic transaction data 530, Card I transactions 540, and Card II transactions 550 may also create a record of the order in which a user generally switches tender. For example, the record may show that a user generally seeks to pay for a transaction using Card I. If Card I is denied, the user tries the same transaction with Card II. Historic transaction data 530 may indicate that the transaction is not completed if Card II is denied. In other words, user A may generally abandon a transaction after trying Card II. In such a case, authorization may be prompted once an authorization request is received from Card II. However, current transaction data 520 indicating usage of Card II prior to Card I may prompt notification of potential fraud since it deviates from the user's habit of using Card I prior to Card II. In a case of such an irregularity, an authorization request from Card II may be denied. Alternately or in addition, the fraudulent activity score 510 may be modified based on the irregularity.

Further, historic transaction data 530 may be used by financial institutions to provide insight on why a user uses card I as the preferred default payment vehicle for a user, and Card II is the alternative. Short deviations from historic transaction data 530 may indicate fraudulent activity, while extended deviations that stabilize over time may indicate a user changing his/her spending habits or lifestyle. In one embodiment, the transaction analysis may be performed by an authorization processor, as shown in FIG. 1. Process of the authorization processor may be performed on or between one or more computing devices.

Figure 6:
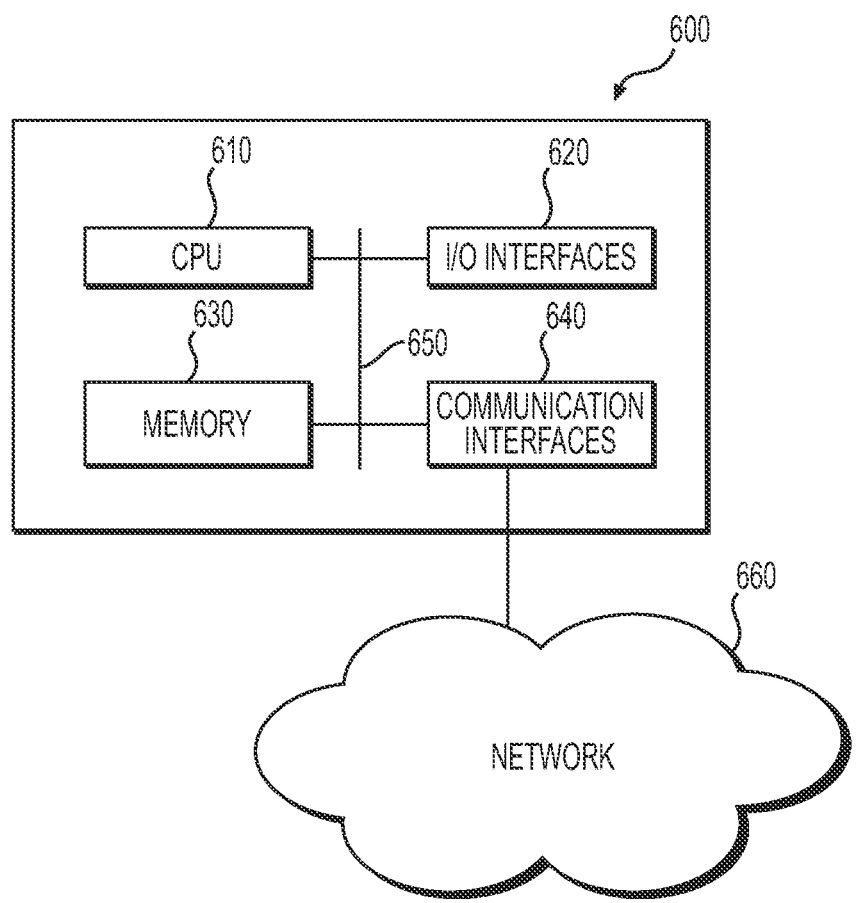
FIG. 6 depicts an example of a computing device for establishing a cross-issuer fraud detection computing system for processing transactions, according to an exemplary embodiment of the present disclosure.

FIG. 6 illustrates an example computing device. A computing device 600 may be a server, a computing device that is integrated with other systems or subsystems, a mobile computing device such as a smart phone, a cloud-based computing ability, and so forth. The computing device 600 may be any suitable computing device as would be understood in the art, including without limitation, a custom chip, and embedded processing device, a tablet computing device, a POS terminal associated with a merchant (e.g., merchant 110), a back-office system of a merchant, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 600 may include a processor 610 that may include any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 600 may also include one or more memories 630, for example a read-only memory (ROM), random access memory (RAM), cache memory associated with the processor 610, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 600 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 610, or memories 630 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

One or more networking communication interfaces 640 may be configured to transmit to, or receive data from, other computing devices 600 across a network 660. The network and communication interfaces 640 may include an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 640 may include wire data transmission links such as Ethernet and TCP/IP. The communication interfaces 640 may include wireless protocols for interfacing with private or public networks 660. For example, the network and communication interfaces 640 and protocols may include interfaces for communicating with private wireless networks such as Wi-Fi network, one of the IEEE 802.11x family of networks, or another suitable wireless network. The network and communication interfaces 640 may include interfaces and protocols for communicating with public wireless networks 660, using for example wireless protocols used by cellular network providers, including Code Division Multiple Access (CDMA) and Global System for Mobile Communications (GSM). A computing device 600 may use network and communication interfaces 640 to communicate with hardware modules such as a database or data store, or one or more servers or other networked computing resources. Data may be encrypted or protected from unauthorized access.

In various configurations, the computing device 600 may include a system bus 650 for interconnecting the various components of the computing device 600, or the computing device 600 may be integrated into one or more chips such as programmable logic device or application specific integrated circuit (ASIC). The system bus 650 may include a memory controller, a local bus, or a peripheral bus for supporting input and output device interfaces 620, and communication interfaces 640. Example input and output interfaces or devices 620 include keyboards, keypads, gesture or graphical input devices, motion input devices, touchscreen interfaces, one or more displays, audio units, voice recognition units, vibratory devices, computer mice, and any other suitable user interface.

The processor 610 and memory 630 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for processing electronic transactions in a virtual environment, using a cross-issuer fraud detection computing system, the method comprising:

intercepting, by one or more processors of the cross-issuer fraud detection computing system and from a point of sale device in real time, an authorization request transmission sent across a payment network between one or more merchants and one or more financial institutions for a transaction initiated with a payment vehicle and occurring in real time at the point of sale device and associated with a user, wherein the authorization request transmission is associated with a plurality of profile data of the user identified with a unique identifier hash in a profile database, and wherein the plurality of profile data includes a plurality of transaction history data and payment vehicle data;

receiving, by the one or more processors of the cross-issuer fraud detection computing system and from the point of sale device, captured location data identifying a precise location of the point of sale device during a electronic transaction occurring in real time;

determining, by the one or more processors of the cross-issuer fraud detection computing system, a fraud risk score for the electronic transaction based on the precise location and the payment vehicle, wherein a value of the fraud risk score exceeds a fraud threshold value for declining an electronic transaction;

determining, by the one or more processors of the cross-issuer fraud detection computing system, a fraud tolerance score for the electronic transaction occurring in real time at the point of sale device based on the received plurality of transaction history data and the received plurality of profile data of the user;

determining, by the one or more processors of the cross-issuer fraud detection computing system, a user-specific fraud threshold score for the user based on the received payment vehicle data, wherein the payment vehicle data indicates a frequency of switching between at least one of one or more payment vehicles and at one other of the one or more payment vehicles during historical electronic transactions associated with the user;

determining, by the one or more processors of the cross-issuer fraud detection computing system and prior to the electronic transaction being completed or abandoned, that the fraud risk score and the fraud tolerance score each fall below the user-specific fraud threshold score;

detecting, by a control logic of an authorization processor and prior to the electronic transaction being completed or abandoned, that the payment vehicle is a last form of tender associated with the user for the electronic transaction based on the frequency of switching between at least one of the one or more payment vehicles and at one other of the one or more payment vehicles during the historical electronic transactions associated with the user; and processing, by an authorization processor in electronic communication with the cross-issuer fraud detection computing system the electronic transaction based on determining that the fraud risk score and the fraud tolerance score each fall below the user-specific fraud threshold score, and based on detecting that the payment vehicle is a last form of tender associated with the user for the electronic transaction and prior to the electronic transaction being completed or abandoned.

2. The computer-implemented method of claim 1, further comprising:

determining, by the one or more processors of the cross-issuer fraud detection computing system and before the authorization request transmission is cancelled for the electronic transaction occurring in real time at the point of sale device, that the fraud risk score and the fraud tolerance score each exceed the user-specific fraud threshold score; and transmitting, by the one or more processors of the cross-issuer fraud detection computing system, a decline message in response to the authorization request transmission of the electronic transaction based on determining that the fraud risk score and the fraud tolerance score each exceed the user-specific fraud threshold score.

3. The computer-implemented method of claim 1, further comprising:

determining, by the one or more processors of the cross-issuer fraud detection computing system, the frequency of switching based, at least in part, on a cart abandonment metric and/or a payment vehicle switching metric, wherein a low payment vehicle switching metric indicates a high cart abandonment metric.

4. The computer-implemented method of claim 3, further comprising:

determining, by the one or more processors of the cross-issuer fraud detection computing system, a decline frequency based on the determined frequency of switching, wherein the decline frequency decreases as the fraud risk score decreases, and wherein the decline frequency is greater for users that switch between the one or more payment vehicles upon denial of the authorization request transmission at one or more instances before abandoning the electronic transaction.

5. The computer-implemented method of claim 1, wherein the fraud tolerance score indicates a level of fraud tolerated specific to the user, and wherein a low fraud tolerance score is determined for the user if several incidences of fraudulent activities are included in the plurality of transaction history data, and wherein the fraud tolerance score is adjusted on a continual basis as transaction data is received for the user.

6. The computer-implemented method of claim 1, wherein the fraud risk score is based on historical data associated with the one or more payment vehicles, the captured location data associated with the electronic transaction, a total amount of the electronic transaction, and/or historical data associated with prior payment vehicles utilized for the electronic transaction.

7. The computer-implemented method of claim 6, wherein the fraud risk score is greater based on the one or more payment vehicles having shorter historical data, lower interest rates, and/or direct access to service providers.

8. The computer-implemented method of claim 1, further comprising:

determining, by the one or more processors of the cross-issuer fraud detection computing system, the frequency of switching based, at least in part, on receiving authorization requests from multiple payment vehicles for the electronic transaction occurring in real time at the point of sale device and/or detecting that the electronic transaction is completed in real time at the point of sale device utilizing a second payment vehicle that is different than a first payment vehicle that initiated the electronic transaction.

9. The computer-implemented method of claim 1, further comprising:

adjusting, by the one or more processors of the cross-issuer fraud detection computing system and as the electronic transaction is occurring in real-time, the user-specific fraud threshold score in response to each instance of payment vehicle switching, wherein the adjusting is pre-determined and is relative to a detected number instances of payment vehicle switching.

10. The computer-implemented method of claim 1, wherein the plurality of transaction history data includes usage data for each of the one or more payment vehicles, one or more authorization request transmissions for transactions associated with the user, and/or completed transactions associated with the user.

11. A cross-issuer fraud detection computing system for processing transactions, the system comprising:

a data storage device storing instructions for authorizing payment for consumer transactions; and one or more processors configured to execute the instructions to perform a method including:

intercepting, by the one or more processors of the cross-issuer fraud detection computing system and from a point of sale device in real time, an authorization request transmission sent across a payment network between one or more merchants and one or more financial institutions for a transaction initiated with a payment vehicle and occurring in real time at the point of sale device and associated with a user, wherein the authorization request transmission is associated with a plurality of profile data of the user identified with a unique identifier hash in a profile database, and wherein the plurality of profile data includes a plurality of transaction history data and payment vehicle data;

receiving, by the one or more processors of the cross-issuer fraud detection computing system and from the point of sale device, captured location data identifying a precise location of the point of sale device during a electronic transaction occurring in real time;

determining, by the one or more processors of the cross-issuer fraud detection computing system, a fraud risk score for the electronic transaction based on the precise location and the payment vehicle, wherein a value of the fraud risk score exceeds a fraud threshold value for declining an electronic transaction;

determining, by the one or more processors of the cross-issuer fraud detection computing system, a fraud tolerance score for the electronic transaction occurring in real time at the point of sale device based on the received plurality of transaction history data and the received plurality of profile data of the user;

determining, by the one or more processors of the cross-issuer fraud detection computing system, a user-specific fraud threshold score for the user based on the received payment vehicle data, wherein the payment vehicle data indicates a frequency of switching between at least one of one or more payment vehicles and at one other of the one or more payment vehicles during historical electronic transactions associated with the user;

determining, by the one or more processors of the cross-issuer fraud detection computing system and prior to the electronic transaction being completed or abandoned, that the fraud risk score and the fraud tolerance score each fall below the user-specific fraud threshold score;

detecting, by a control logic of an authorization processor and prior to the electronic transaction being completed or abandoned, that the payment vehicle is a last form of tender associated with the user for the electronic transaction based on the frequency of switching between at least one of the one or more payment vehicles and at one other of the one or more payment vehicles during the historical electronic transactions associated with the user; and processing, by an authorization processor in electronic communication with the cross-issuer fraud detection computing system the electronic transaction based on determining that the fraud risk score and the fraud tolerance score each fall below the user-specific fraud threshold score, and based on detecting that the payment vehicle is a last form of tender associated with the user for the electronic transaction and prior to the electronic transaction being completed or abandoned.

12. The system of claim 11, wherein the processor is further configured for:

determining, by the one or more processors of the cross-issuer fraud detection computing system and before the authorization request transmission is cancelled for the electronic transaction occurring in real time at the point of sale device, that the fraud risk score and the fraud tolerance score each exceed the user-specific fraud threshold score; and transmitting, by the one or more processors of the cross-issuer fraud detection computing system, a decline message in response to the authorization request transmission of the electronic transaction based on determining that the fraud risk score and the fraud tolerance score each exceed the user-specific fraud threshold score.

13. The system of claim 11, wherein the processor is further configured for:

determining, by the one or more processors of the cross-issuer fraud detection computing system, the frequency of switching based, at least in part, on a cart abandonment metric and/or a payment vehicle switching metric, wherein a low payment vehicle switching metric indicates a high cart abandonment metric.

14. The system of claim 13, wherein the processor is further configured for:

determining, by the one or more processors of the cross-issuer fraud detection computing system, a decline frequency based on the determined frequency of switching, wherein the decline frequency decreases as the fraud risk score decreases, and wherein the decline frequency is greater for users that switch between the one or more payment vehicles upon denial of the authorization request transmission at one or more instances before abandoning the electronic transaction.

15. The system of claim 11, wherein the fraud tolerance score indicates a level of fraud tolerated specific to the user, and wherein a low fraud tolerance score is determined for the user if several incidences of fraudulent activities are included in the plurality of transaction history data, and wherein the fraud tolerance score is adjusted on a continual basis as transaction data is received for the user.

16. The system of claim 11, wherein the fraud risk score is based on historical data associated with the one or more payment vehicles, the captured location data associated with the electronic transaction, a total amount of the electronic transaction, and/or historical data associated with prior payment vehicles utilized for the electronic transaction.

17. The system of claim 16, wherein the fraud risk score is greater based on the one or more payment vehicles having shorter historical data, lower interest rates, and/or direct access to service providers.

18. A non-transitory machine-readable medium storing instructions that, when executed by a server, cause the server to perform a method for processing transactions using a cross-issuer fraud detection computing system, the method comprising:

intercepting, by one or more processors of the cross-issuer fraud detection computing system and from a point of sale device in real time, an authorization request transmission sent across a payment network between one or more merchants and one or more financial institutions for a transaction initiated with a payment vehicle and occurring in real time at the point of sale device and associated with a user, wherein the authorization request transmission is associated with a plurality of profile data of the user identified with a unique identifier hash in a profile database, and wherein the plurality of profile data includes a plurality of transaction history data and payment vehicle data;

receiving, by the one or more processors of the cross-issuer fraud detection computing system and from the point of sale device, captured location data identifying a precise location of the point of sale device during a electronic transaction occurring in real time;

determining, by the one or more processors of the cross-issuer fraud detection computing system, a fraud risk score for the electronic transaction based on the precise location and the payment vehicle, wherein a value of the fraud risk score exceeds a fraud threshold value for declining an electronic transaction;

determining, by the one or more processors of the cross-issuer fraud detection computing system, a fraud tolerance score for the electronic transaction occurring in real time at the point of sale device based on the received plurality of transaction history data and the received plurality of profile data of the user;

determining, by the one or more processors of the cross-issuer fraud detection computing system, a user-specific fraud threshold score for the user based on the received payment vehicle data, wherein the payment vehicle data indicates a frequency of switching between at least one of one or more payment vehicles and at one other of the one or more payment vehicles during historical electronic transactions associated with the user;

determining, by the one or more processors of the cross-issuer fraud detection computing system and prior to the electronic transaction being completed or abandoned, that the fraud risk score and the fraud tolerance score each fall below the user-specific fraud threshold score;

detecting, by a control logic of an authorization processor and prior to the electronic transaction being completed or abandoned, that the payment vehicle is a last form of tender associated with the user for the electronic transaction based on the frequency of switching between at least one of the one or more payment vehicles and at one other of the one or more payment vehicles during the historical electronic transactions associated with the user; and processing, by an authorization processor in electronic communication with the cross-issuer fraud detection computing system the electronic transaction based on determining that the fraud risk score and the fraud tolerance score each fall below the user-specific fraud threshold score, and based on detecting that the payment vehicle is a last form of tender associated with the user for the electronic transaction and prior to the electronic transaction being completed or abandoned.

19. The non-transitory machine-readable medium of claim 18, wherein the method further comprises:

determining, by the one or more processors of the cross-issuer fraud detection computing system and before the authorization request transmission is cancelled for the electronic transaction occurring in real time at the point of sale device, that the fraud risk score and the fraud tolerance score each exceed the user-specific fraud threshold score; and transmitting, by the one or more processors of the cross-issuer fraud detection computing system, a decline message in response to the authorization request transmission of the electronic transaction based on determining that the fraud risk score and the fraud tolerance score each exceed the user-specific fraud threshold score.

20. The non-transitory machine-readable medium of claim 18, wherein the method further comprises:

determining, by the one or more processors of the cross-issuer fraud detection computing system, the frequency of switching based, at least in part, on a cart abandonment metric and/or a payment vehicle switching metric, wherein a low payment vehicle switching metric indicates a high cart abandonment metric.

* * * * *